US007647583B2

(12) United States Patent
Zeidman et al.

(10) Patent No.: US 7,647,583 B2
(45) Date of Patent: Jan. 12, 2010

(54) METHOD AND APPARATUS FOR EMULATING A HARDWARE/SOFTWARE SYSTEM USING A COMPUTER

(76) Inventors: Robert M Zeidman, 7599 Squirewood Way, Cupertino, CA (US) 95014-5014; Daniel R Hafeman, 198 Donner Ct., Sunnyvale, CA (US) 94086

( * ) Notice: Subject to any disclaimer, the term of this patent is extended or adjusted under 35 U.S.C. 154(b) by 790 days.

(21) Appl. No.: 10/249,938

(22) Filed: May 20, 2003

(65) Prior Publication Data

US 2004/0237062 A1 Nov. 25, 2004

(51) Int. Cl.
*G06F 9/44* (2006.01)
*G06F 9/45* (2006.01)
*G06F 9/46* (2006.01)

(52) U.S. Cl. .................. 717/121; 717/138; 719/327
(58) Field of Classification Search .......... 717/136, 717/138; 703/28
See application file for complete search history.

(56) References Cited

U.S. PATENT DOCUMENTS

| 6,188,975 B1 * | 2/2001 | Gay .................. 703/22 |
| 6,427,224 B1 * | 7/2002 | Devins et al. .......... 716/4 |
| 6,615,167 B1 * | 9/2003 | Devins et al. ......... 703/28 |
| 6,658,633 B2 * | 12/2003 | Devins et al. ........ 716/5 |
| 6,971,046 B1 * | 11/2005 | Johnson et al. ....... 714/35 |
| 2004/0205755 A1 * | 10/2004 | Lescouet et al. ..... 718/100 |

OTHER PUBLICATIONS

"Analysis of hardware and software approaches to embedded in-circuit emulation of microprocessors", Chen et al., Jan. 2002, pp. 127-133. Online retrieved at <http://delivery.acm.org/10.1145/570000/563948/p127-chen.pdf>.*
"The A to Z of SoCs", Bergamaschi et al., Nov. 2002, pp. 790-798. Online retrieved at <http://delivery.acm.org/10.1145/780000/774689/p791-bergamaschi.pdf>.*
"A bypass scheme for core-based system fault testing", Nourani et al., Feb. 1998, pp. 979-980. Online retrieved at <http://delivery.acm.org/10.1145/370000/368562/p979-nourani.pdf>.*

* cited by examiner

*Primary Examiner*—Tuan Q Dam
*Assistant Examiner*—Thuy Dao

(57) ABSTRACT

A platform for running embedded software using an inexpensive standard personal computer is disclosed. A particular embodiment includes a compiler assist component and a runtime component. The compiler assist component operates in conjunction with a standard personal computer compiler to compile an embedded system application to run on a conventional personal computer. The runtime component executes on the personal computer and operates in conjunction with the standard operating system drivers to allow an emulated system to communicate with real hardware connected to the personal computer or to virtual hardware that is simulated on the personal computer.

12 Claims, 9 Drawing Sheets

METHOD AND APPARATUS FOR EMULATING A HARDWARE/SOFTWARE SYSTEM USING A COMPUTER

BACKGROUND OF INVENTION

The present invention relates to tools for software development. In particular, the present invention relates to a tool for developing embedded systems.

Microprocessors are showing up in almost every imaginable piece of hardware, from computer monitors to network routers to automobiles to intelligent household appliances. This proliferation means that more software must be developed by more programmers. This software is closely tied to the system hardware.

Because of this, software development is usually delayed until the system hardware is available. Software developers would like to write, test, and debug software in parallel with hardware development.

Several methods are currently available to allow software to be run and debugged before the hardware system is available. The programmer can use a demo board, a hardware emulator, a re-targeting compiler, an instruction level simulator, or software models.

A demo board is typically provided by a processor manufacturer for the purpose of debugging software before hardware is available. A demo board includes the same processor as the target system hardware. A demo board also includes memory and a number of standard hardware interfaces. Software can be loaded into memory and run by the processor on the demo board. A demo board can be connected to other systems through its standard interfaces.

A major drawback of a demo board is that it can only support specific, standard interfaces. If interfaces on the hardware system being developed are not identical to those on the demo board, the system interfaces cannot be tested. If the hardware on the demo board is not identical to the hardware in the system begin developed, the system software will need to be modified in order to use it on the demo board. As larger numbers of modifications are required for the software to run on the demo board, a developer will spend more time later debugging the real system software on the real target system hardware, making the demo board a less effective tool.

A hardware emulator is a special purpose computer that simulates hardware. Companies such as Mentor Graphics, Quickturn Design Systems, and Axis Systems sell hardware emulators. To use a hardware emulator, a developer first creates a hardware design using a hardware description language such as Verilog or VHDL. Typically, the design describes system hardware at a register transfer level (RTL) or at a gate level, though it is also possible to describe the system hardware at a behavioral level. The description is compiled and downloaded into the hardware emulator. The hardware emulator then executes the functionality of the hardware. The hardware emulator can emulate a chip, a board, or an entire system. The hardware emulator has input and output connectors, allowing it to emulate simple interfaces to other hardware and other systems. The hardware emulator can also plug into a target board or target system and control the hardware interfaces of the target board or system. Software can be loaded into memory on the target board or system and the hardware emulator will run the software just as the real system hardware will.

There are several drawbacks to using a hardware emulator for software development. First, a hardware emulator runs one or two orders of magnitude slower than the real system hardware. Real-time embedded systems have timing requirements and responses to specific events must occur within a set time limit. A hardware emulator cannot test this important timing function of the software. Also, external hardware often includes timeouts that cause the hardware to give up and assume that there is a problem with the system if a device does not respond to an event within a certain time. In many cases, a hardware emulator cannot respond in time and therefore cannot be connected to an external system. Because of the slow speed of hardware emulators, only a limited number of instruction cycles can be executed. Also, a complete hardware design must be loaded into the emulator, so a hardware emulator can only be used after the hardware design is nearly complete. Thus, software debugging must still wait until an advanced stage of the hardware design. Hardware emulators also tend to be very expensive.

A re-targeting compiler is software that runs on a host computer with a particular processor. A re-targeting compiler takes high-level code written in a language like C, C++, or Pascal and compiles it into low-level machine code for a different processor on the target system hardware. For example, with a re-targeting compiler, high-level code written for an ARM processor can be compiled for a Pentium processor, allowing the code to run on a conventional personal computer (PC).

A real-time operating system (RTOS) is defined as an operating system designed specifically for use in real-time systems. A real-time system is defined as any computer system, embedded or otherwise, that has timeliness requirements. The following question can be used to distinguish real-time systems from the other types of systems: "Is a late answer as bad, or even worse, than a wrong answer?" In other words, what happens if the computation doesn't finish in time? If nothing bad happens, it is not a real-time system. If someone dies or the mission fails, it is generally considered "hard" real-time, which is meant to imply that the system has hard deadlines. Everything in between is a "soft" real-time system.

The main disadvantage of using a re-targeting compiler to debug software for a real-time system is that it cannot be used for testing hardware interfaces. The compiled code must be run and debugged on a host hardware system that is different from that of the target system hardware. Even if the interfaces were similar on both systems, the driver software required to access the interfaces differs substantially on each system. Controlling interface hardware requires long sequences of code. A re-targeting compiler works at too low a level to convert a hardware device driver used by one system to one that will work on another system.

An instruction set simulator is software that runs on a computer and interprets low-level instructions for another computer, allowing software written for one system to be executed on a different system that is easily available. For example, with an instruction level simulator, software can be written for an embedded system that uses an ARM processor. There are currently no general-purpose computers based on ARM processors. An instruction set simulator running on a PC that uses an Intel Pentium processor reads each low-level ARM instruction and executes one or more low-level Pentium instructions to perform the same action as the ARM processor would.

An instruction set simulator is useful for debugging code. However, like a re-targeting compiler, it is not useful for testing hardware interfaces. The hardware of the computer on which an instruction set simulator is running often is substantially different from that of the system hardware. Even if the interfaces are similar, the driver software required to access the interfaces on the computer running the instruction set simulator will be different from the driver software required to access the interfaces on the actual target system. Driver software requires long sequences of code to control interface hardware. An instruction set simulator works at too low a level to convert a hardware device driver used by one system to a hardware device driver that will work on another system.

An instruction set simulator is still much slower than the real target system because each instruction must be read and emulated in software. As stated earlier, real-time embedded systems have timing requirements, and responses to specific events must occur within a set time limit. A hardware emulator cannot test this important timing function of the software. Also, external hardware often has timeouts that cause the hardware to give up and assume that there is a problem with the system if a device does not respond to an event within a certain time. In many cases, an instruction set simulator cannot respond in time and therefore cannot communicate with an external system.

Software models of hardware can also be used to debug software. These models run in a simulator on a general-purpose computer. Software models act as virtual hardware with virtual interfaces. Software can be loaded into the memory of these models and the model of the processor will run the code in the model of the memory. The processor model can access models of interface devices, which can communicate with models of real world systems. Software models can model very large systems. Software can be run on these models and the effects of the software on very large systems can be observed.

One disadvantage of software models is that models are much slower than real hardware. Critical timing cannot be examined using software models. Also, models must be written for each piece of hardware that needs to be tested, including the processor, memory, and all hardware interfaces. Models must be written to simulate real-world data coming into the software models. Finally, the accuracy of the models is open to question. It is very difficult to create a high-level software model that is even close to 100% accurate.

SUMMARY OF INVENTION

The present invention consists of an apparatus and a method that turns an inexpensive, conventional personal computer (PC) into a platform for running embedded software in real time. In one embodiment, the present invention consists of two software components. The first component is the compiler assist software. This component works with a standard PC compiler to compile an embedded system application into executable code that will run on a conventional PC. The second component is the runtime software. This component runs on a PC and works with conventional operating system (OS) hardware driver software to allow an emulated system to communicate with real hardware that is connected to the PC or to virtual hardware that is simulated on the PC.

For example, if the embedded system software that is being emulated needs to communicate to the real world via a serial port, the compiler assist component replaces the embedded system software's serial port driver with a new driver when the embedded system software is compiled. During execution, the runtime component handles communication between the PC serial port, driver and the new driver without letting the PC operating system interfere. From the viewpoint of the embedded system software, when it needs to send or receive data, it calls its serial port driver. From the viewpoint of any external device, serial data is transmitted and received from the embedded system being emulated by the PC, as expected. From the viewpoint of the PC operating system, there is no activity on the serial port. In this way, all of the hardware interfaces of the PC are available to the embedded system software.

Similarly, the embedded system software can communicate over virtual interfaces. For example, a Fibre Channel interface can be modeled on the PC. During compilation, the compiler assist component replaces the embedded system software's Fibre Channel driver with a new driver. When the embedded system software needs to send data through its Fibre Channel driver during execution, the data is routed through the runtime component to a model of a Fibre Channel device running on the PC. Entire systems can be modeled on the PC and used to test the functionality of the embedded system software.

The present invention provides several unique features that speed development and debug time of embedded systems. These features are:

Hardware mimicking: Because the present invention manipulates the data, it can change protocols to allow one type of hardware peripheral to look like another. For example, if a new type of network interface is being developed but is not yet available for a PC, the present invention can change packet formats on the fly, disassembling and reassembling them, to emulate the new interface.

Virtual peripherals: The present invention can create virtual devices that exist only in software. Data can be transmitted to and received from these virtual devices as if they were actually connected to the real-time system.

Error injection: Error detection and correction can be tested with the present invention because the present invention can inject various kinds of errors and incorrect data into the data stream and record the effect on the RTOS, the embedded system application software, and the hardware peripherals.

Data logging: The present invention facilitates debugging because it can record long data transfers that an engineer can use to determine where and when errors occur.

Further features and advantages of various embodiments of the invention are described in the detailed description below, which is given by way of example only.

BRIEF DESCRIPTION OF DRAWINGS

The present invention will be understood more fully from the detailed description given below and from the accompanying drawings of the preferred embodiment of the invention, which, however, should not be taken to limit the invention to the specific embodiment but are for explanation and understanding only.

DETAILED DESCRIPTION

Figure 1:
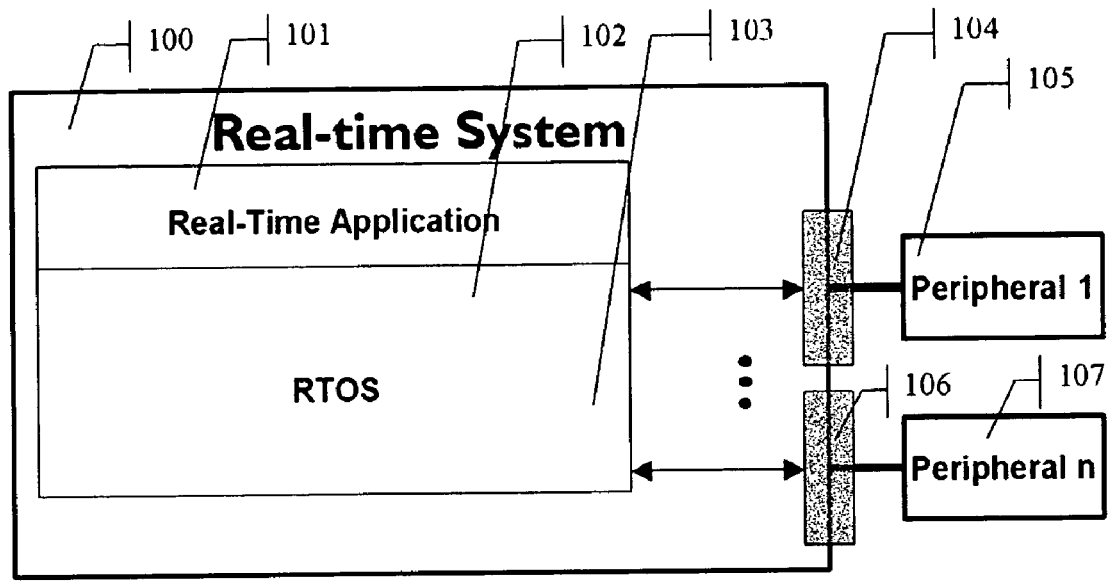
FIG. 1 is a high-level diagram of a real-time embedded system.

The present invention consists of an apparatus and a method that turns an inexpensive, conventional personal computer (PC) into a platform that runs embedded software. FIG. 1 illustrates a target system that is a real-time system 100 consisting of both hardware and software. The software, running on a processor in the real-time system, has a real-time operating system (RTOS) 103 that controls a number of interfaces, depicted in the drawing as 104 and 106, that connect to a number of hardware peripherals, depicted in the drawing as 105 and 107. The RTOS 102 allocates time and resources to the real-time application 101. This allows the real-time system to communicate with a number of peripherals represented by 105 and 107, which might be computer monitors, keyboards, mice, networking devices, serial devices, or other types of peripherals.

Figure 2:
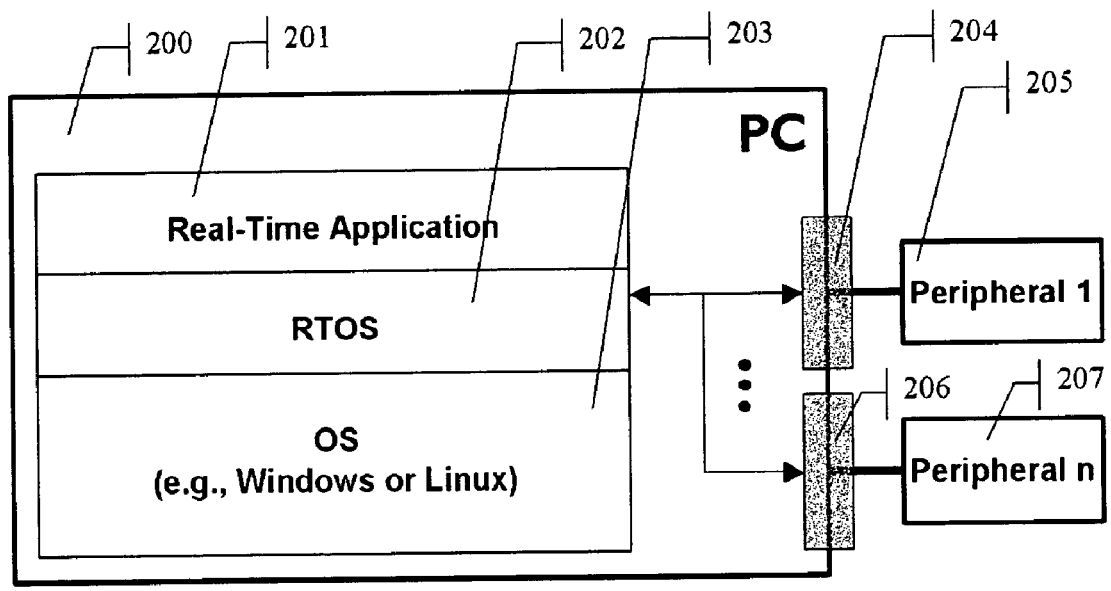
FIG. 2 is a high-level diagram of a conventional personal computer (PC) using the present invention to emulate an embedded system.

In FIG. 2, a personal computer 200 is used to emulate a real-time system. A processor in the PC executes real-time software application 201 on top of an RTOS 202 as it would in the actual target system. In this emulation, the RTOS 202 runs as an application on top of the PC operating system (OS) 203 that executes on the processor in the PC. Normally, the PC OS 203 would control all input and output of the computer via a number of I/O interfaces represented by 204 and 206. This situation would allow the computer to communicate with a number of peripherals represented by 205 and 207, which might be computer monitors, keyboards, mice, networking devices, serial devices, or other types of peripherals. The present invention allows the RTOS 202 to communicate directly with I/O interfaces 204 and 206 without requiring the OS 203 to be involved. In this way, the software acts similarly to the system running on the actual target hardware where the RTOS 202 will have direct control of the hardware peripherals.

In one embodiment, the present invention consists of two software components. The first component, the compiler assist software, works in conjunction with a standard PC compiler to modify and compile an embedded system application to run on a conventional PC. The second component, the runtime software, runs on a PC that works in conjunction with standard operating system (OS) hardware drivers to allow an emulated system to communicate with real hardware connected to the PC or to virtual hardware that is simulated on the PC.

Figure 3:
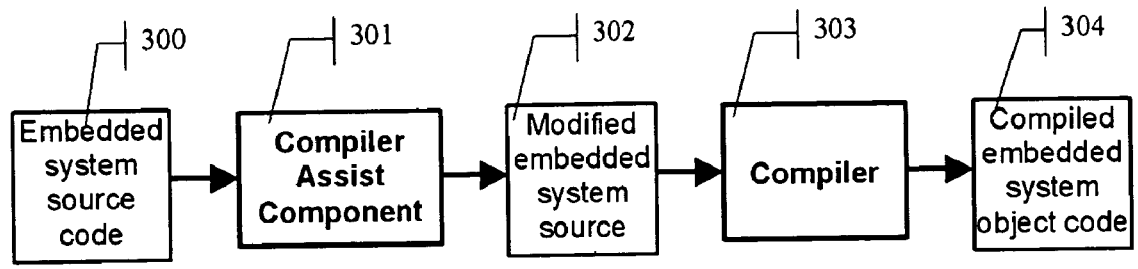
FIG. 3 illustrates how the compiler assist component of the present invention assists the compiler by modifying the embedded system-software before compilation.

FIG. 3 shows how the compiler assist component 301 of the present invention works in conjunction with a standard PC compiler 303. The compile assist component 301 inspects the embedded system source code 300 and finds the source code for all hardware driver routines. These hardware driver routines may be in the RTOS 202 or in the application software 201. The compiler assist component 301 converts these hardware driver source code routines to source code routines that perform application program interface (API) calls to the runtime component software of the present invention. The output of the compiler assist component 301 is modified source code 302, which contains the substituted hardware driver source code routines. This modified source code 302 is then compiled using a standard PC compiler 303, which produces object code 304 that can be executed directly on the PC 200 as an application running on top of the PC OS 203.

For example, an Ethernet interface driver in the embedded system source code 300 would be substituted with an API call to the runtime component, specifying an Ethernet interface, in the modified source code 302. Also, one interface could be substituted for another for emulation purposes. For example, if the embedded system source code 300 specifies a hardware driver for a Fibre Channel device and no Fibre Channel driver is available for the PC, the compiler assist component 301 could substitute an API call to the runtime component specifying a Fibre Channel driver in the modified source code 302. The runtime component of the present invention would then manipulate Ethernet data from the Ethernet interface to emulate a Fibre Channel device. In this way, the system could still be emulated and connected to a live network for testing, even though no Fibre Channel device is available.

Figure 4:
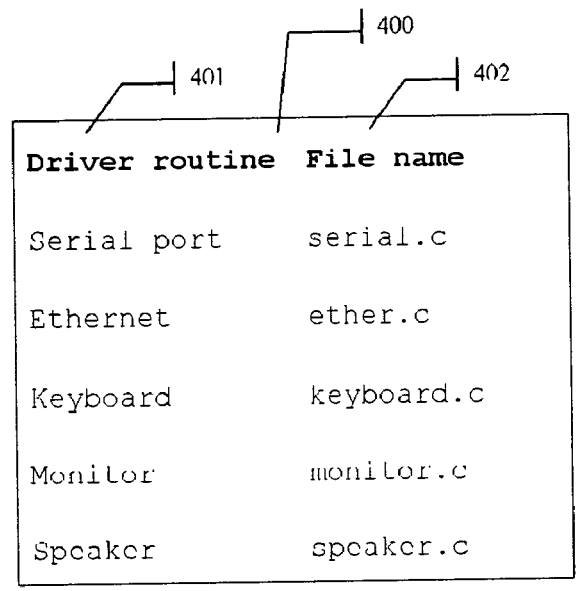
FIG. 4 is a list, maintained by the compiler assist component of the present invention, of the driver routines that are used in the embedded code and of the files in which the source code for these routines are stored.
Figure 5:
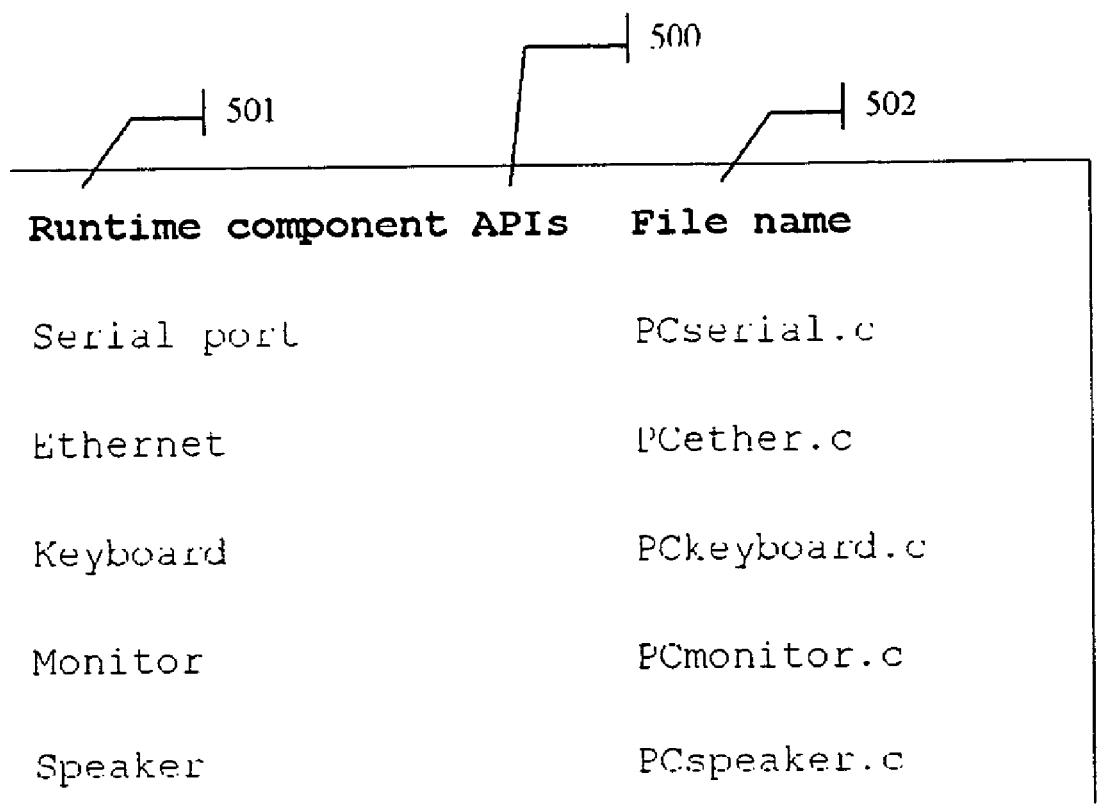
FIG. 5 is a list, maintained by the compiler assist component of the present invention, of the PC API routines that are available to it.

FIG. 4 shows a list 400 that is maintained by one embodiment of the present invention. This list contains the driver routines 401 that are used in the embedded code and the files 402 in which the source code for these routines are stored. This list may be manually maintained by the programmer or it may be automatically generated by a software utility program. FIG. 5 shows a list 500 that the compiler assist component maintains of the runtime component API routines 501 that are available to it and of the files 502 in which the source code for these API routines are stored. The compiler assist component reads through the list of driver routines 401 and substitutes the corresponding runtime component API routines 501. This substitution may simply be accomplished by renaming the original driver files 402 to temporary names and copying the runtime component API files 502 to take their place as described by the flow chart in FIG. 6.

Figure 6:
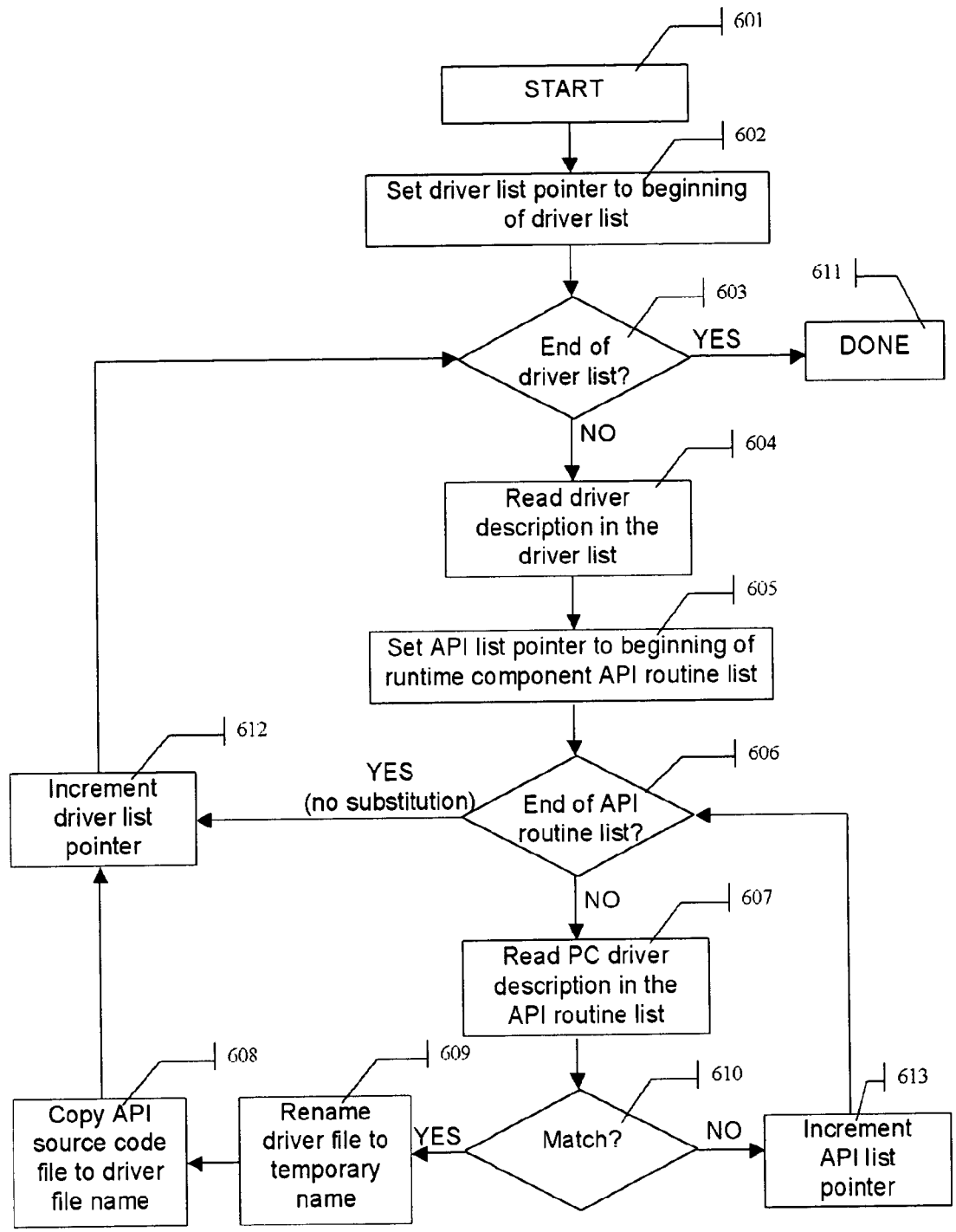
FIG. 6 is a flow chart that illustrates execution of one embodiment of the compiler assist component of the present invention.

In this embodiment, the compiler assist component is a program that follows the flow shown in FIG. 6. The program starts in block 601. The program proceeds to block 602 and sets the driver list pointer to the beginning of the driver list. The program then proceeds to block 603 to determine whether the end of the driver list has been reached. If the end has been reached, the program proceeds to block 611 and terminates. If the end has not been reached, the program proceeds to block 604 and reads the next driver description in the driver list. The program proceeds to block 605 and sets the API pointer to the beginning of the runtime component API routine list. The program proceeds to block 606 and tests for the end of the runtime component API routine list. If the end has been reached, the program proceeds to block 612 where the driver list pointer is incremented and then returns to block 603 to test for the end of the driver list. In this case the program does not make a substitution for that particular driver in the original code. Optionally, the program can signal to the user an error or a message that this particular driver cannot be emulated.

If the end of the runtime component API routine list has not been reached in block 606, the program proceeds to block 607 and reads the description of the next runtime component API routine description in the runtime component API routine list. The program proceeds to block 610 where it tests whether the runtime component API routine description matches the original driver description. If there is no match, the program proceeds to block 613 where it increments the API list pointer, then returns to block 606 and continues to read more runtime component API routine descriptions, looking for a match.

If there is a match in block 610, the program proceeds to block 609 where it renames the file containing the original driver, giving the file a temporary name. The program proceeds to block 608 where it copies the runtime component API routine source code file, giving it the name that the original driver source code file had before it was renamed in block 609. The program then proceeds to block 612 where the driver list pointer is incremented and then returns to block 603 to continue reading more driver descriptions from the original code in order to substitute runtime component API routines.

Figure 7:
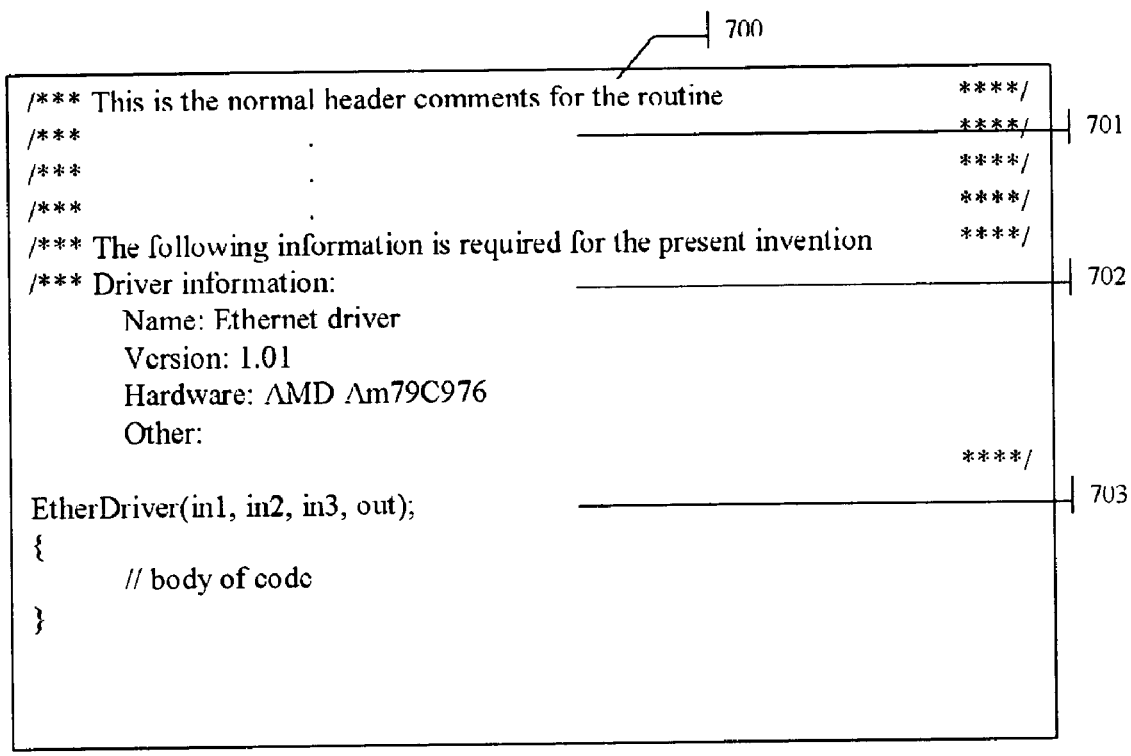
FIG. 7 is an illustration of an example of driver routine source code with headers that allow the compiler assist component of the present invention to identify it.

In a second embodiment, the compiler assist component examines the source code and finds each driver routine by searching for a specific header that a programmer has written to describe the task. FIG. 7 shows an example of driver routine source code. The driver source code 700 contains three sections. The first section 701 is the normal header for the routine. It contains comments that describe such things as the date the routine was created, the date it was modified, the author of the code, and a brief description of the functionality of the code. It is the header needed for the compiler assist component of the present invention. This section 702 contains specific information that the compiler assist component uses to determine which hardware this driver source code controls and which equivalent PC API routine source code can be substituted. This section 702 may contain information-about the hardware that the driver is controlling, the revision number of the driver, and other information that the compiler assist component can use. The third section 703 is the driver source code that performs the necessary functions when compiled and executed.

Figure 8:
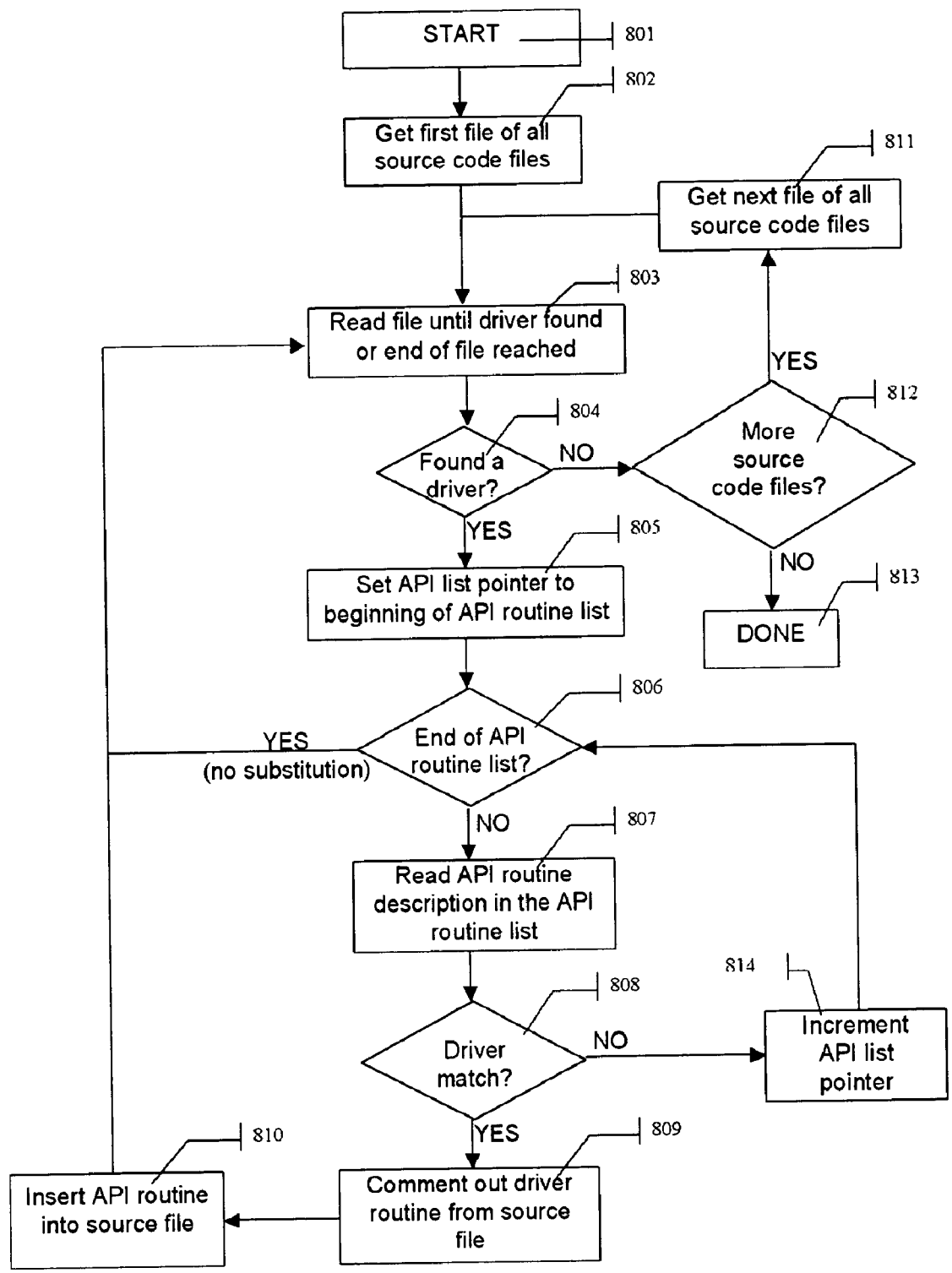
FIG. 8 is a flow chart that illustrates execution of a second embodiment of the compiler assist component of the present invention.

The execution of the compiler assist component program in this embodiment is illustrated by the flowchart in FIG. 8. The program begins in block 801 and proceeds to block 802 where the program gets the first file from a list of all source code files. The program proceeds to block 803 where lines of the file are read until driver source code is found or the end of the file is reached. The program then proceeds to block 804 where it tests whether it has found driver source code. If a driver has not been found, then the end of the file has been reached and the program proceeds to block 812 which checks for more source files to be examined. If there are more source files, the program proceeds to block 811 where the next source file is retrieved and then returns to block 803. From block 812, if there are no more source code files to examine, the program proceeds to block 813 and terminates.

If a driver has been found in the source code file at block 804, the program proceeds to block 805 where the API list pointer is set to the beginning of a list of all PC API routines. The program proceeds to block 806 where the API list pointer is tested to determine whether the end of the list of PC API routines has been reached. If the end has been reached, the program returns to block 803. In this case, no driver is substituted for the one found in the original source code. Optionally, a warning message may be displayed to the user.

If the end of the PC API routine list has not been reached in block 806, the program proceeds to block 807 and the next PC API routine description in the list is read. The program proceeds to block 808 where the program tests whether the driver description from the source code matches the API routine description read from the PC API routine list. If there is no match, the program proceeds to block 814 where the API list pointer is incremented and then returns to block 806. If the description does match in block 808, the program proceeds to block 809 where the original source code driver routine is commented out. The program then proceeds to block 810 where the selected PC API routine source code is placed into the original source code file. The program then returns to block 803.

The runtime component software resides on the PC; its job is twofold, depending on whether the direction of data is to or from a hardware peripheral. When the RTOS calls the hardware driver to send data, the runtime component is the program that actually injects the data into the driver without the need for the underlying PC operating system to know about it. Similarly, when the device returns data through the hardware driver, the runtime component extracts the data and sends it to the RTOS without the knowledge of the underlying PC operating system. The runtime component allows the present invention to take advantage of standard, fully tested hardware drivers in the standard PC operating system.

The runtime component also allows data to be buffered in the case where the RTOS, running on the PC, has latencies that will not occur in the real system. Data coming into the system can be buffered when the peripheral hardware is fast and the emulated RTOS is slow. Data going out of the system can be buffered when the hardware peripheral is a slow prototype, emulation, or simulation of a device that is still being tested and debugged.

Figure 9:
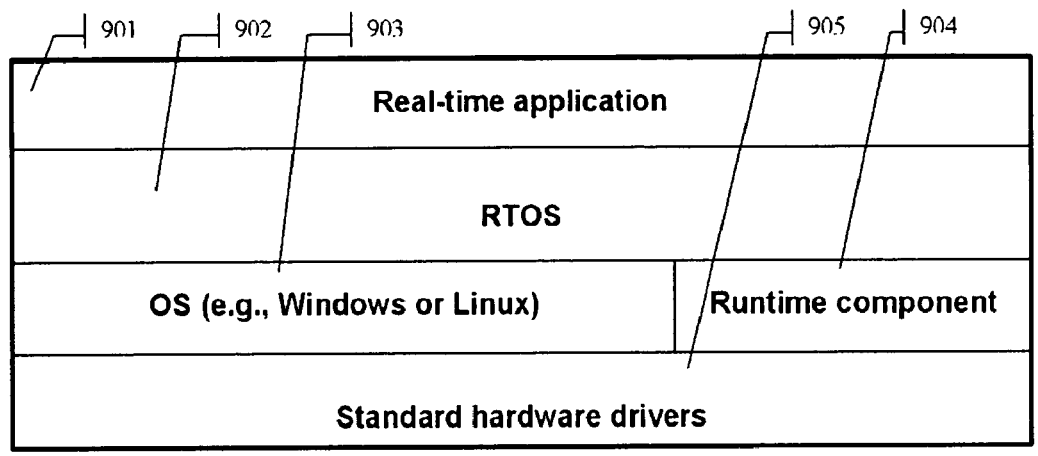
FIG. 9 illustrates the software architecture for embedded software being emulated on a conventional PC by the present invention.

As shown in FIG. 9, the application program 901 for a real-time system runs on top of the RTOS 902. The RTOS 902, in turn, runs on top of the PC operating system 903, which can be Windows, Linux, or any other PC operating system. At the same time, when the RTOS 902 attempts to access hardware in the PC, the request goes through the runtime component software 904, which accesses the hardware drivers 905 of the operating system and bypasses the PC operating system 903. The application software 901 acts as though it is running on the final target hardware system it is controlled by the RTOS 902 and is able to access the PC hardware directly.

Figure 10:
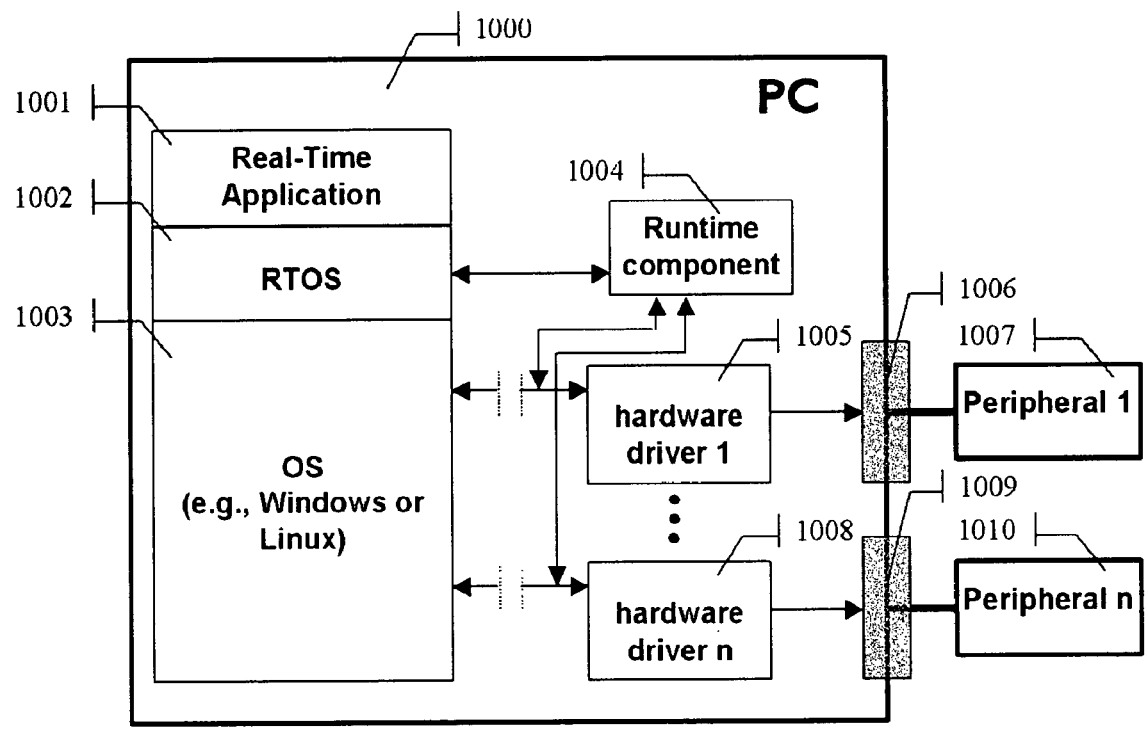
FIG. 10 illustrates how the runtime component of the present invention redirects accesses to and from standard OS hardware drivers without affecting the OS.

FIG. 10 shows another representation of the different parts of a real-time system being emulated on a PC 1000 and how they interact with the runtime component 1004 of the present invention. The application program 1001 for a real-time embedded system runs on top of the RTOS 1002. The RTOS 1002, in turn, runs on top of the PC operating system 1003, which can be Windows, Linux, or any other PC operating system. At the same time, when the RTOS 1002 attempts to access a hardware peripheral 1007 via an I/O interface 1006 on the PC, the request goes through the runtime component software 1004, which accesses the hardware drivers 1005 and bypasses the PC operating system 1003. The application software 1001 acts as though it is running on the final hardware system it is controlled by the RTOS 1002 and is able to access the PC hardware peripherals 1007 directly.

Figure 11:
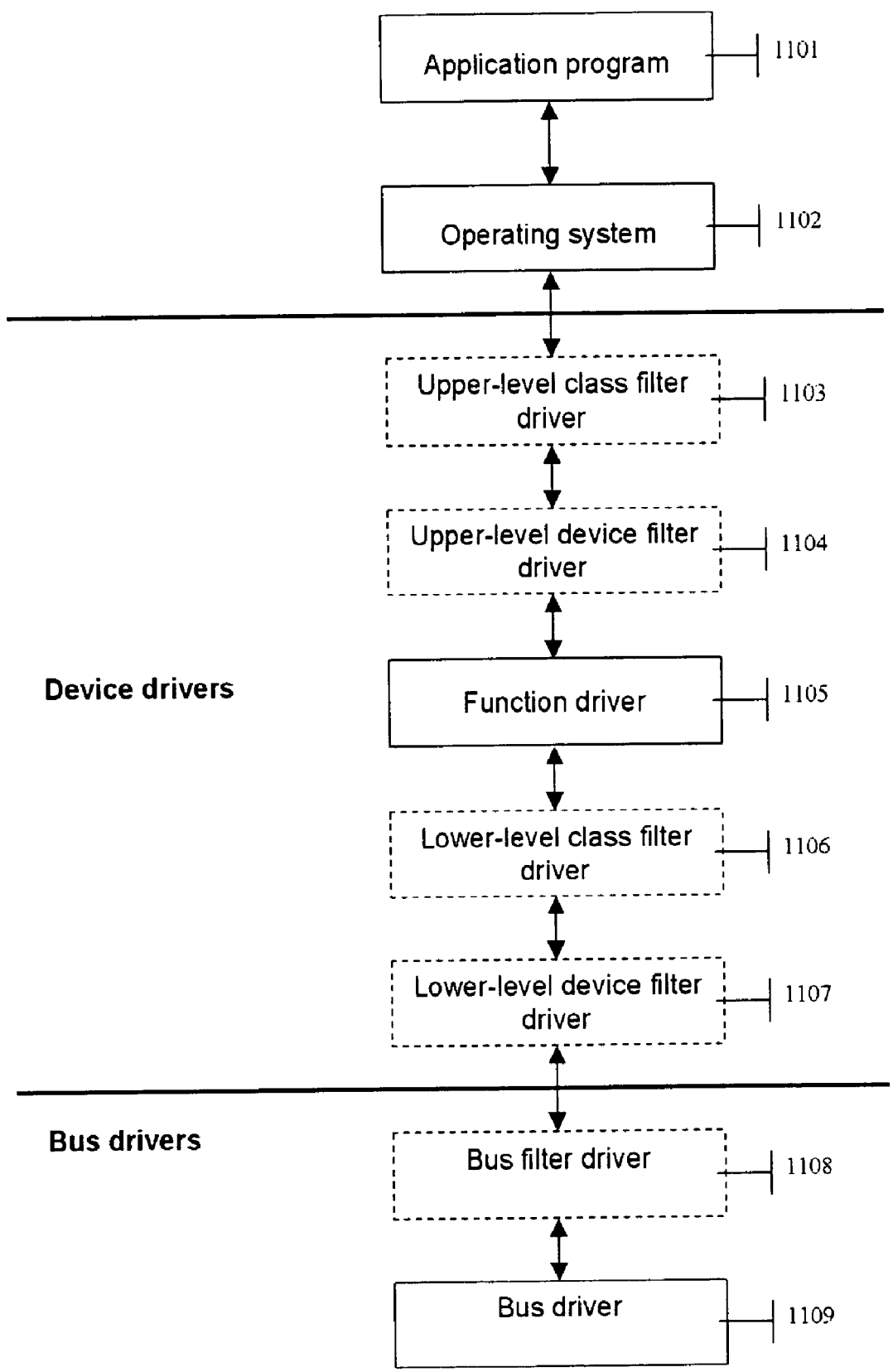
FIG. 11 illustrates how an application program normally accesses hardware peripherals through driver software, using the Windows Driver Model (WDM) implementation of Microsoft Windows as an example.

FIG. 11 shows how an application program normally accesses hardware peripherals through driver software. Application program 1101 makes a call to the hardware driver software through an API call to the operating system 1102, which then accesses the hardware driver software.

FIG. 11 also shows the stack for a standard driver for the Microsoft Windows 2000 PC operating system. This standard stack is called the Windows Driver Model, or WDM. It consists of bus drivers, function drivers, and filter drivers, which are defined in the following paragraphs.

Bus drivers 1109 drive an I/O bus and provide per-slot functionality that is device independent. A bus driver services a bus controller, adapter, or bridge. Bus drivers are required drivers; there is one bus driver for each type of bus on a machine. Microsoft provides bus drivers for most common buses.

Function drivers 1105 drive an individual device. A function driver is the main driver for a device. A function driver is typically written by the device vendor and is required. It adds the high level functionality to a device. For example, if an engineer were developing a USB printer, the function driver would drive the printer but would not be aware of the USB protocols of the bus driver.

Filter drivers 1103, 1104, 1106, 1107, and 1108 filter I/O requests for a device, a class of device, or a bus. The specific filter drivers are described below.

- A bus filter driver 1108 typically adds features to a bus and is supplied by Microsoft or a system OEM. There can be any number of bus filter drivers for a bus. For USB, for example, the bus filter driver adds the necessary functions to read and write the USB controller chip.
- Lower-level filter drivers 1106 and 1107 typically modify the behavior of device hardware. They are optional and there can be any number of lower-level filter drivers for a device.
- Upper-level filter drivers 1103 and 1104 typically provide additional features for a device. They are also optional.

Figure 12:
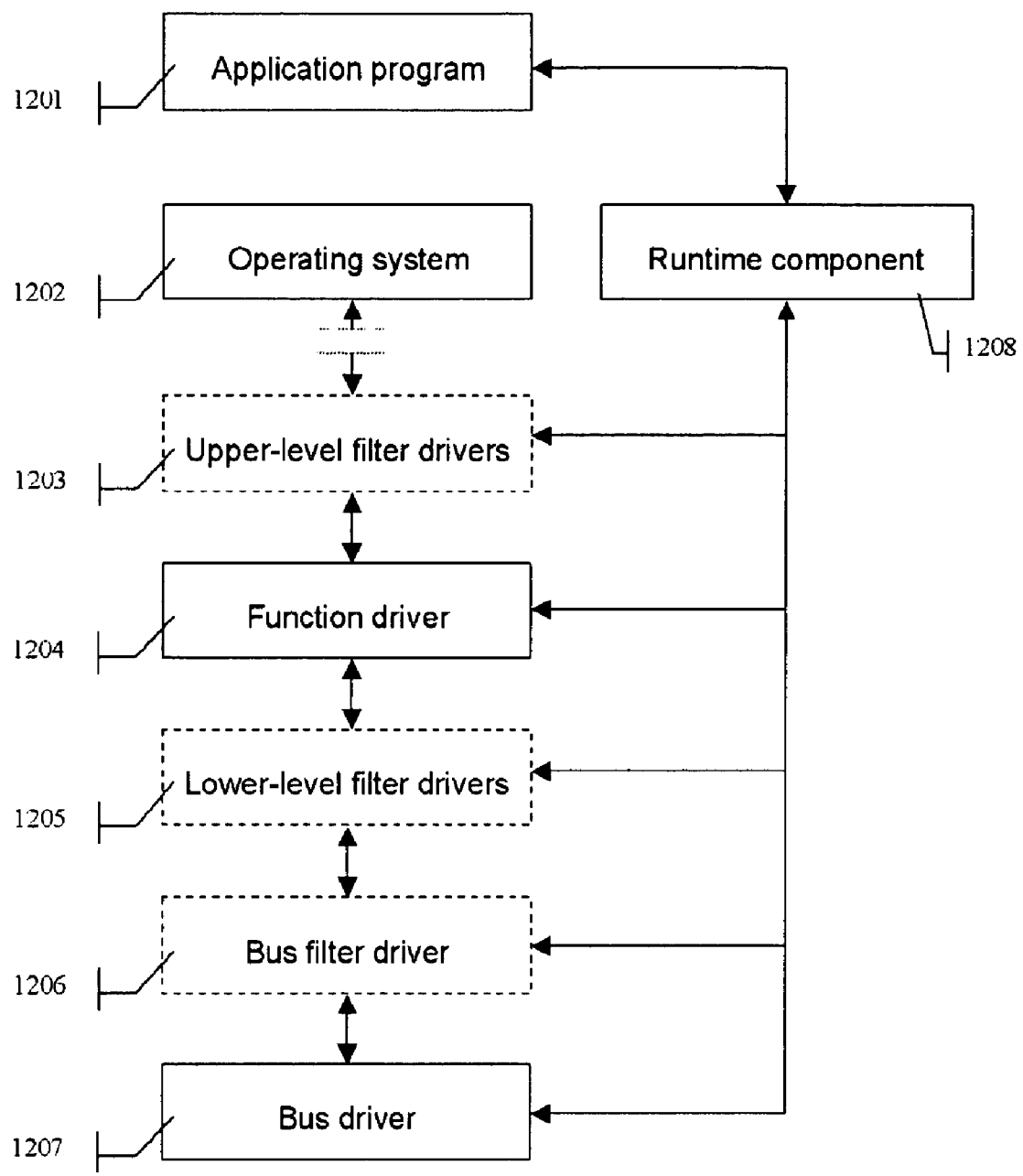
FIG. 12 illustrates how the runtime component of the present invention allows the application software to bypass the PC operating system and access the hardware peripherals while still using the standard PC driver software.

FIG. 12 shows how the runtime component of the present invention allows the application 1201 to bypass the PC operating system 1202 and access the hardware peripherals while still making use of the standard PC driver software. The application program 1201 makes a call to the hardware driver software through an API call to the runtime component 1208 of the present invention rather than through an API call to the PC operating system 1202. The runtime component 1208 can insert and extract data at any point in the driver stack to retrieve data from a hardware peripheral or to send data to a hardware peripheral.

The process for creating WDM drivers is described in detail in the book "Writing Windows WDM Device Drivers" by Chris Cant, published by CMP Books. Writing software to insert data into a WDM driver and extract data from a WDM driver can be learned from the concepts explained in this book. Methods for inserting data into other drivers and extracting data from drivers is explained in the following patent applications by inventor Robert Zeidman: "Apparatus And Method For Connecting A Hardware Emulator To A Computer Peripheral," application Ser. No. 10/158,772 filed on May 31, 2002, and "Apparatus And Method For Connecting Hardware To A Circuit Simulation," application Ser. No. 10/158,648 filed on May 31, 2002.

Various modifications and adaptations of the operations described here would be apparent to those skilled in the art based on the above disclosure. Many variations and modifications within the scope of the present invention are therefore possible. The present invention is set forth by the following claims.

We claim:

1. A method comprising:
   providing a first operating system configured to operate in a first computer system;
   providing first computer code configured to operate on top of said first operating system, said first operating system being configured to control physical input/output devices on the first computer system via first device drivers in the first computer code;
   providing a second operating system, different from the first operating system, configured to operate in a second computer system, said second operating system being configured to control physical input/output devices on the second computer system via second device drivers;
   providing an executable runtime component configured to take control of the physical input/output devices on the second computer system from the second operating system using the second device drivers that are normally controlled by the second operating system;
   modifying said first computer code by replacing the first device drivers in said first computer code with substituted device drivers, the substituted device drivers being configured to call said executable runtime component at runtime;
   executing said first operating system and said modified first computer code on top of said second operating system in said second computer system; and
   using said executable runtime component to bypass said second operating system and to take control of the physical input/output devices on the second computer system using the second device drivers that are normally controlled by the second operating system when said modified first computer code executes said substituted device drivers.

2. The method of claim 1 wherein replacing the first device drivers in said first computer code includes:
   searching said first computer code for device drivers;
   searching a list containing names of device drivers and names of corresponding substitute device drivers;
   finding a match between a name of the first device drivers and a name of corresponding substitute device drivers from said list; and
   replacing the first device drivers with the substitute device drivers that correspond to said matched substitute device drivers from said list.

3. The method of claim 1 wherein replacing the first device drivers in said first computer code includes:
   searching said first computer code for device drivers;
   searching a list containing descriptions of device drivers and names of corresponding substitute device drivers;
   finding a match between a description of the first device drivers and a name of corresponding substitute device drivers from said list; and
   replacing the first device drivers with the substitute device drivers that correspond to said matched substitute device drivers from said list.

4. The method of claim 1, including:
   searching said first computer code for calls to device drivers; and
   substituting said calls to device drivers with calls to said executable runtime component.

5. An article of manufacture comprising at least one machine readable storage medium having one or more computer programs stored thereon and operable on one or more computing systems to:
   provide a first operating system configured to operate in a first computer system;
   provide first computer code configured to operate on top of said first operating system, said first operating system being configured to control physical input/output devices on the first computer system via first device drivers in the first computer code;

provide a second operating system, different from the first operating system, configured to operate in a second computer system, said second operating system being configured to control physical input/output devices on the second computer system via second device drivers;

provide an executable runtime component configured to take control of the physical input/output devices on the second computer system from the second operating system using the second device drivers that are normally controlled by the second operating system;

modify said first computer code by replacing the first device drivers in said first computer code with substituted device drivers, the substituted device drivers being configured to call said executable runtime component at runtime;

execute said first operating system and said modified first computer code on top of said second operating system in said second computer system; and use said executable runtime component to bypass said second operating system and to take control of the physical input/output devices on the second computer system using the second device drivers that are normally controlled by the second operating system when said modified first computer code executes said substituted device drivers.

6. The article of manufacture as claimed in claim 5 being further configured to:
search said first computer code for device drivers;
search a list containing names of device drivers and names of corresponding substitute device drivers;
find a match between a name of the first device drivers and a name of corresponding substitute device drivers from said list; and
replace the first device drivers with the substitute device drivers that correspond to said matched substitute device drivers from said list.

7. The article of manufacture as claimed in claim 5 being further configured to:
search said first computer code for device drivers;
search a list containing descriptions of device drivers and names of corresponding substitute device drivers;
find a match between a description of the first device drivers and a name of corresponding substitute device drivers from said list; and
replace the first device drivers with the substitute device drivers that corresponds to said matched substitute device drivers from said list.

8. The article of manufacture as claimed in claim 5 being further configured to:
search said first computer code for calls to device drivers; and
substitute said calls to device drivers with calls to said executable runtime component.

9. A computing apparatus comprising:
a first computer system;
a second computer system;
a first operating system, being executable on the first computer system;
first computer code, being configured to operate on top of the first operating system, said first operating system being configured to control physical input/output devices on the first computer system via first device drivers in the first computer code;
a second operating system, different from the first operating system, configured to operate in the second computer system, said second operating system being configured to control physical input/output devices on the second computer system via second device drivers;
an executable runtime component, being configured to take control of the physical input/output devices on the second computer system from the second operating system using the second device drivers that are normally controlled by the second operating system;
a code modification component, being configured to modify said first computer code by replacing the first device drivers in said first computer code with substituted device drivers, the substituted device drivers being configured to call said executable runtime component at runtime; and
said executable runtime component being used to bypass said second operating system and to take control of the physical input/output devices on the second computer system using the second device drivers that are normally controlled by the second operating system when said modified first computer code executes said substituted device drivers.

10. The computing apparatus as claimed in claim 9 being further configured to:
search said first computer code for device drivers;
search a list containing names of device drivers and names of corresponding substitute device drivers;
find a match between a name of the first device drivers and a name of corresponding substitute device drivers from said list; and
replace the first device drivers with the substitute device drivers that correspond to said matched substitute device drivers from said list.

11. The computing apparatus as claimed in claim 9 being further configured to:
search said first computer code for device drivers;
search a list containing descriptions of device drivers and names of corresponding substitute device drivers;
find a match between a description of the first device drivers and a name of corresponding substitute device drivers from said list; and
replace the first device drivers with the substitute device drivers that corresponds to said matched substitute device drivers from said list.

12. The computing apparatus as claimed in claim 9 being further configured to:
search said first computer code for calls to device drivers; and
substitute said calls to device drivers with calls to said executable runtime component.

* * * * *